US010243361B2

(12) United States Patent
Raghunathan

(10) Patent No.: US 10,243,361 B2
(45) Date of Patent: Mar. 26, 2019

(54) DECENTRALIZED CONTROL OF ELECTRICITY PASSING THROUGH ELECTRICAL GRID

(71) Applicant: Mitsubishi Electric Research Laboratories, Inc., Cambridge, MA (US)

(72) Inventor: Arvind Raghunathan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 204 days.

(21) Appl. No.: 15/065,057

(22) Filed: Mar. 9, 2016

(65) Prior Publication Data

US 2017/0264094 A1 Sep. 14, 2017

(51) Int. Cl.
*H02J 3/00* (2006.01)
*G05B 13/04* (2006.01)
*H02J 3/38* (2006.01)

(52) U.S. Cl.
CPC .............. *H02J 3/00* (2013.01); *H02J 3/38* (2013.01); *H02J 3/382* (2013.01); *H02J 3/383* (2013.01); *H02J 3/386* (2013.01)

(58) Field of Classification Search
CPC ........................................................ H02J 3/00
See application file for complete search history.

(56) References Cited

U.S. PATENT DOCUMENTS

| 7,962,769 | B1 | 6/2011 | Patel et al. |
| 8,364,287 | B2 | 1/2013 | Pearson et al. |
| 8,401,709 | B2 | 3/2013 | Cherian et al. |
| 8,601,299 | B2 | 12/2013 | Diab |
| 8,649,912 | B2 | 2/2014 | Boss et al. |
| 2008/0039980 | A1* | 2/2008 | Pollack ............... B60L 11/1824 700/295 |
| 2009/0319415 | A1 | 12/2009 | Stoilov et al. |
| 2011/0112987 | A1* | 5/2011 | Basak ................... G06Q 30/00 705/412 |
| 2013/0218355 | A1 | 8/2013 | Spyros et al. |

FOREIGN PATENT DOCUMENTS

EP 1625646 A1 2/2006

* cited by examiner

*Primary Examiner* — Seahvosh Nikmanesh
(74) *Attorney, Agent, or Firm* — Gene Vinokur; James McAleenan; Hironori Tsukamoto

(57) ABSTRACT

An amount of electricity passing through an electrical grid is controlled by balancing amount of electricity for each energy provider and each energy consumer. In response to transmitting requests for the electricity, a decentralized control system receives an amount of electricity each energy operator agrees to supply or demand to satisfy the requests, as well as a sensitivity of the amount of electricity to a variation of at least one parameter of a corresponding request. The system updates parameters of at least some requests in directions governed by the corresponding sensitivities to produce a balanced amount of electricity for each energy provider and each energy consumer. The system causes the energy providers to supply into the electrical grid their corresponding balanced amounts of electricity and causes the energy consumers to consume from the electrical grid their corresponding balanced amounts of electricity.

20 Claims, 9 Drawing Sheets

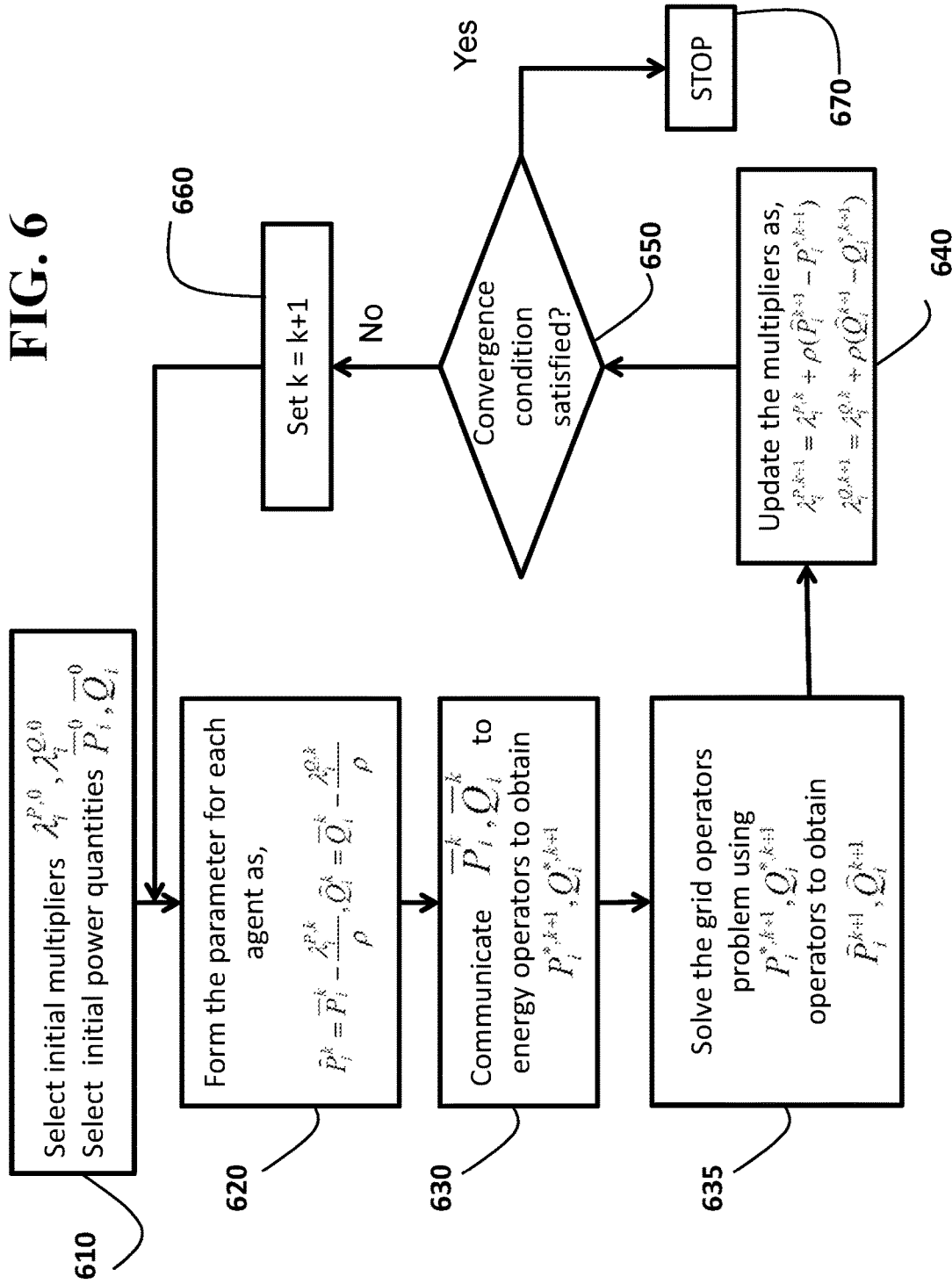

$Y_{bus}$ is a $|N| \times |N|$ matrix with elements defined as $$Y_{bus}(i,j) = \begin{cases} -y_{ij} \text{ if } (i,j) \in E \\ -y_{ji} \text{ if } (j,i) \in E \\ \sum_{(i,j) \in E} y_{ij} + \sum_{(j,i) \in E} y_{ji} \end{cases}$$

$Y_{bus,i} = \zeta_i \zeta_i^T Y_{bus}; Y_{bus,ij} = y_{ij} \zeta_i \zeta_i^T - y_{ij} \zeta_i \zeta_j^T$ $Y_i = \frac{1}{2} \begin{bmatrix} \text{Re}(Y_{bus,i}^T + Y_{bus,i}) & \text{Im}(Y_{bus,i}^T - Y_{bus,i}) \\ \text{Im}(Y_{bus,i}^T - Y_{bus,i}) & \text{Re}(Y_{bus,i}^T + Y_{bus,i}) \end{bmatrix}; \bar{Y}_i = -\frac{1}{2} \begin{bmatrix} \text{Im}(Y_{bus,i} + Y_{bus,i}^T) & \text{Re}(Y_{bus,i} - Y_{bus,i}^T) \\ \text{Re}(Y_{bus,i} - Y_{bus,i}^T) & \text{Im}(Y_{bus,i} + Y_{bus,i}^T) \end{bmatrix}$ $Y_{ij} = \frac{1}{2} \begin{bmatrix} \text{Re}(Y_{bus,ij} + Y_{bus,ij}^T) & \text{Im}(Y_{bus,ij}^T - Y_{bus,ij}) \\ \text{Im}(Y_{bus,ij}^T - Y_{bus,ij}) & \text{Re}(Y_{bus,ij} + Y_{bus,ij}^T) \end{bmatrix}; \bar{Y}_{ij} = -\frac{1}{2} \begin{bmatrix} \text{Im}(Y_{bus,ij} + Y_{bus,ij}^T) & \text{Re}(Y_{bus,ij} - Y_{bus,ij}^T) \\ \text{Re}(Y_{bus,ij} - Y_{bus,ij}^T) & \text{Im}(Y_{bus,ij} + Y_{bus,ij}^T) \end{bmatrix}$ where $\zeta_i$ denotes a vector of size $|N|$ with a 1 at the $i$-th component and zeros elsewhere.

FIG. 7

DECENTRALIZED CONTROL OF ELECTRICITY PASSING THROUGH ELECTRICAL GRID

FIELD OF THE INVENTION

The present invention relates to generally to electrical grids, and more particularly to a system and a method for controlling an amount of electricity passing through an electrical grid.

BACKGROUND OF THE INVENTION

As the interest in power generated from renewable energy resources rapidly increases, increasing attention is being focused systems and methods in which such power is produced, transmitted, delivered, and consumed. Despite technological advances in developing renewable energy resources and in electricity grids, current energy infrastructure suffers from many limitations that need rapid improvement as demand for such power increases, and grid security importance and regulatory requirements for use of "green" resources become more prominent.

Power derived from renewable energy such as solar, wind, wave, and solar thermal resources are becoming increasingly relied upon, but each includes several limitations that impede them from becoming widespread, low-cost, efficient, and continually viable sources of electricity. Each is inherently unreliable, owing to factors such as changes in the time of day and variations in weather conditions that mean that maximized performance of components for each resource is very difficult to manage. Combining any of these together proves even more difficult to manage the inherent inefficiencies involved in operating devices and components to meet energy demand.

Nonetheless, requirements for using power generated from "clean" or "green" renewable resources are rapidly increasing. Enhanced ecological and environmental awareness, and a desire to reduce energy dependency on carbon-based fossil fuels and to decrease availability and price concerns resulting from exposure to geopolitical concerns, has led many governments to implement regulations that either dictate or impose limits on the amount of power produced and consumed that is generated from carbon-based or otherwise non-renewable energy sources. Because of this, there is a strong and continually developing need for efficient and cost-effective power generated from renewable energy resources.

In addition, an electrical grid is not a single entity but an aggregate of multiple networks and multiple power generation companies with multiple energy operators employing varying levels of communication and coordination. A smart grid increases connectivity, automation and coordination among power suppliers and power consumers and the networks that carry that power for performing either long-distance transmissions or local distribution.

The current power distribution system involves multiple entities. For example, production of power may represent one entity; while the long distance transmission of power another. Each of these entities interacts with one or more distribution networks that ultimately deliver electricity to the consumer. While the divisions of control described herein are not absolute, they nonetheless represent a hurdle for dynamic control of power over a distributed power grid.

When the demand for power by a group of power consumers exceeds the production capability of their associated power production facility, that facility can request excess power from other networked power providers. There is a limit to the distance power can be reliably and efficiently transported, thus as consumer demand increases, more regional power providers are required. The consumer has little control over who produces the power it consumes.

A number of limitations of the grid can impede a flow of electricity. For example, there may be time- and/or geographically-dependent limitations on ability of the grid to support transmission of electricity, based on one or more of: supply and demand for the electricity, general conditions on the grid itself, e.g., aging, failing or dated equipment, and location-specific or congestion issues. This problem becomes even more complicated with introduction of renewable, but unreliable, sources of the energy. For example, the energy provider or the energy consumer can act as a regional energy operator distributing energy between energy generators and loads located within a corresponding region. Due to various reasons, including unreliability of renewable source of the energy, the regional energy operator can be both the energy provider and the energy consumer at different point of time. For example, the regional energy operator is the energy provider when the energy generators of the region produce more energy than demanded by the loads in the regions. In contrast, the regional energy operator is the energy consumer when the energy generators of the region produce less energy than demanded by the loads in the regions. Such versatility disturbs the balance between the energy provided to an electrical grid and the energy consumed from the electrical grid.

To that end, some conventional methods determine and maintain the balance of energy flow in the electrical grid by determining the amount of energy each energy provider or energy consumer needs to supply or consume. For example, the method disclosed in U.S. Pat. No. 8,401,709 teaches the control system that collects all information from all energy operators to determine their corresponding amounts of energy. However, this method requires that each energy operator share all information with the control system, which can be undesirable in some situations due to the privacy constraints.

Accordingly, there is a need for controlling an amount of electricity passing through an electrical grid while preserving privacy constraints of each energy operator.

SUMMARY OF THE INVENTION

Some embodiments of the invention are based on recognition that different energy operators that can supply to electricity to an electrical grid or consume the electricity from the electrical grid need to determine their corresponding needs for the amounts of electricity on their own and/or independent from each other. In such a manner, each energy operator can use its own data and optimization procedure, which decentralize the optimization the electricity and preserve the privacy of individual energy operator.

However, this decentralized optimization creates a need for balancing the supply and demand of the electricity, which individually determined by the energy operators. Moreover, the balancing needs to be determined under privacy constraints of each energy operator. Unfortunately, the balancing of the individually determined amounts of electricity under privacy constraints results in optimization of a non-differentiable objective function, which can be solved by a subgradient method. However, the solution of the subgradient method can be too slow for balancing the supply and demand of the electricity in real time. This is because, the subgradient methods are slower than Newton's method when applied to differentiable convex functions. However, Newton's method fails to converge on problems that have non-differentiable kinks.

Some embodiments of the invention are based on realization that in addition to the amounts for producing and consuming electricity, the energy operators can share their sensitivities to the variations of the requests for energy. Sharing such a sensitivity does not violate current privacy constraints, but allows to improve the search for a balanced amount of electricity for each energy provider and each energy consumer.

For example, some embodiments use the sensitivities to formulate the non-smooth, i.e., non-differentiable, equations as semismooth equations, which in turn allows using Newton-based method for the solution. Newton-based method has faster rates of convergence than the subgradient one. Also, the Newton-based method converges at superlinear rate around the solution.

For example, some embodiments of the invention provide methods for optimizing power flow in electric power networks that maintains balance between demand and supply using a decomposition and coordination procedure. The decomposition procedure distributes the optimization problem into a set of smaller disjoint parameterized optimization problems that are independent of each other. The coordination procedure modifies the parameter associated with the individual problems to ensure that a solution of the entire problem is attained.

The methods are based on decomposing the problems so that the requests for energy providers and energy consumers are decoupled into sets of smaller decoupled optimization problems. In one embodiment of the method, the theory of semi-smooth equations is used in the coordination procedure. The semismooth equation theory ensures that superlinear convergence can be theoretically guaranteed in a neighborhood of the solution. Further, the theory allows for using a merit function to ensure global convergence to a solution using initial parameters that are not near the solution.

In one embodiment, the theory of smoothing based methods is used to solve the decomposed problems. A monotonic decrease of the smoothing parameter is used to ensure that superlinear convergence can be theoretically guaranteed in the neighborhood of a solution. Further, the theory allows for using a merit function to ensure global convergence to a solution even when the initial parameters are far from optimal.

In another embodiment, an alternating direction method of multiplier algorithm is applied to the decomposed problem. The alternating method of multipliers algorithm allows for faster rates of convergence to the solution as compared to traditional approaches.

Accordingly, one embodiment discloses a method for controlling an amount of electricity passing through an electrical grid. The method includes transmitting, through a communication channel, to energy providers and energy consumers requests for the electricity, wherein the requests include requests for providing the electricity having parameters varying for at least two energy providers, and wherein the requests include requests for consuming the electricity having parameters varying for at least two energy consumers; receiving, from each energy provider and each energy consumer, an amount of electricity the energy provider agrees to supply or the energy consumer agrees to demand to satisfy the requests; receiving, from each energy provider and each energy consumer, a sensitivity of the amount of electricity to a variation of at least one parameter of a corresponding request; updating parameters of at least some requests in directions governed by the corresponding sensitivities to produce a balanced amount of electricity for each energy provider and each energy consumer; and causing the energy providers to supply into the electrical grid their corresponding balanced amounts of electricity and causing the energy consumers to consume from the electrical grid their corresponding balanced amounts of electricity. The steps of the method are performed using a processor.

Another embodiment discloses a method for controlling an amount of electricity passing through an electrical grid including transmitting to each energy providers and each energy consumers their corresponding prices for the electricity; receiving, from each energy provider and each energy consumer, an amount of electricity the energy provider agrees to supply for its corresponding price or the energy consumer demands at its corresponding price; receiving, from each energy provider and each energy consumer, a sensitivity of the amount of electricity to a variation of the corresponding price; updating the price to solve a semismooth equation of a balance of the supply and the demand of the amounts of electricity using the corresponding sensitivities; repeating iteratively the transmitting, the receiving and the updating until a termination condition is met to produce a balanced amount of electricity for each energy provider and each energy consumer; and causing the energy provider to supply into the electrical grid their corresponding balanced amounts of electricity and causing the energy consumers to consume from the electrical grid their corresponding balanced amounts of electricity. The steps of the method are performed using a processor.

Yet another embodiment discloses a system for controlling an amount of electricity passing through an electrical grid, including a transceiver configured to transmit to energy providers and energy consumers requests for the electricity, wherein the requests include requests for providing the electricity having parameters varying for at least two energy providers, and wherein the requests include requests for consuming the electricity having parameters varying for at least two energy consumers; receive, from each energy provider and each energy consumer, an amount of electricity the energy provider agrees to supply or the energy consumer agree to demand to satisfy the requests; and receive, from each energy provider and each energy consumer, a sensitivity of the amount of electricity to a variation of at least one parameter of a corresponding request; and a processor operatively connected to the transceiver, the processor is configured to update parameters of at least some requests in directions governed by the corresponding sensitivities to produce a balanced amount of electricity for each energy provider and each energy consumer; and generate a command causing the energy providers to supply into the electrical grid their corresponding balanced amounts of electricity and causing the energy consumers to consume from the electrical grid their corresponding balanced amounts of electricity.

BRIEF DESCRIPTION OF THE DRAWINGS

FIG. 6 is a block diagram of a method for balancing the supply and demand of the electricity according to another embodiment of the invention; and FIG. 7 is a block diagram of matrices used by some embodiments of the invention.

DETAILED DESCRIPTION OF THE PREFERRED EMBODIMENT

Figure 1A:
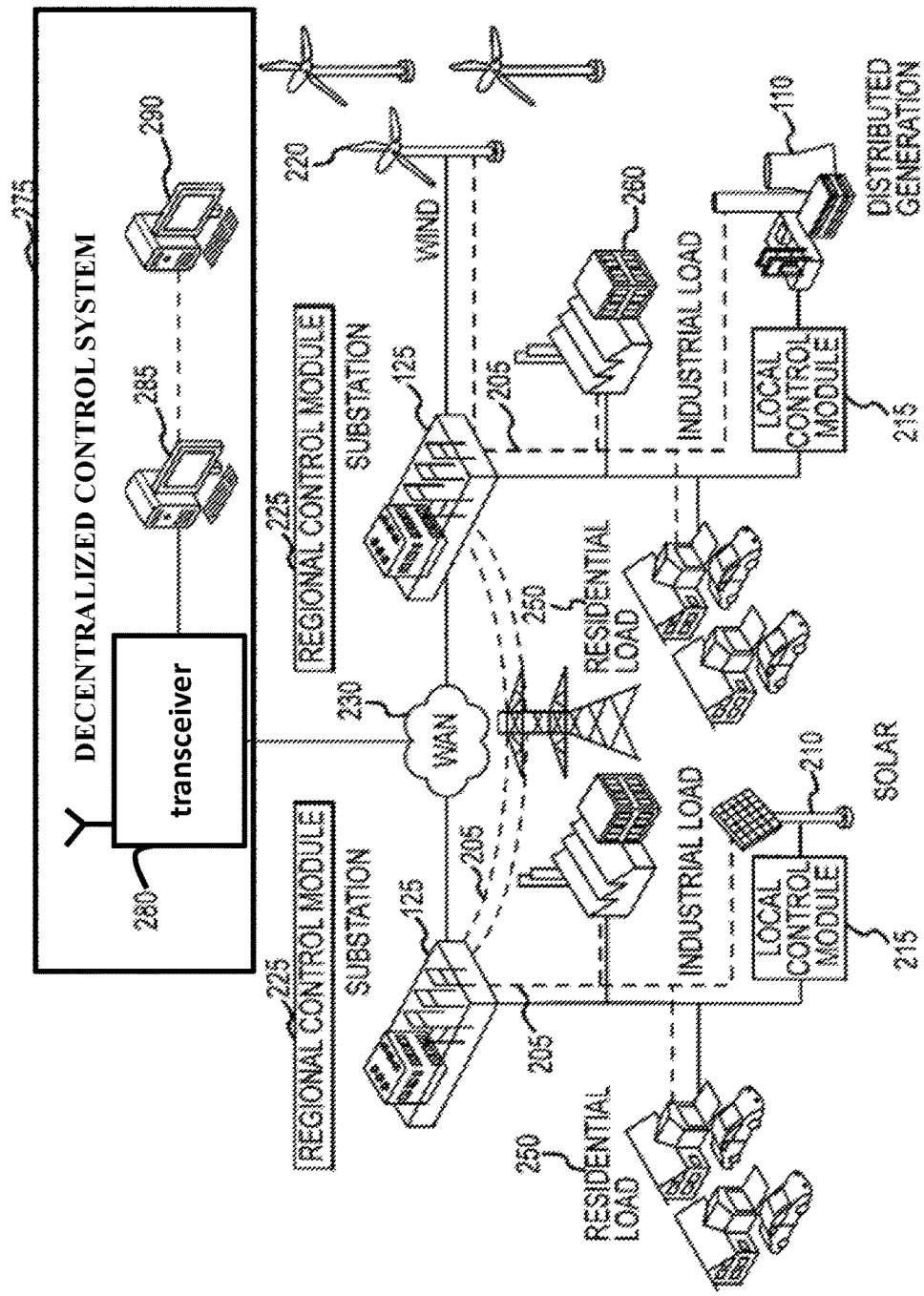
FIG. 1A is a schematic of an exemplar electrical grid controlled according to one embodiment of the invention.

FIG. 1A shows a schematic of an exemplar electrical grid controlled according to one embodiment of the present invention. The traditional power generation facilities 110 are coupled to substations 125 as are renewable source of the energy such as wind turbine farms 220 and solar arrays 210. While FIG. 1 shows three forms of power generation, one skilled in the art will recognize that the present invention is applicable to any form of power generation or energy source. Indeed some embodiments of the invention are equally capable of managing power added to the distributed energy grid from batteries as may be found in electric vehicles as long as the power is compatible with the grid format.

Associated with each substation 125 is a regional control module 225. The regional control module manages power production, distribution, and consumption within its region. Also associated with each region are industrial loads 260 representative of large commercial enterprises and/or residential loads 250. According to some embodiments of the invention, each regional control module using one or more applications is operable to manage the power distribution and production within its region.

For example, in some embodiments of the invention, each regional control module is an independent regional energy operator distributing energy between energy generators and loads located within a corresponding region. In addition to control the electricity within the region, the regional energy operator can supply the excess of the electricity into the grid, or consume needed electricity from the grid. For example, depending on the time of the day, weather conditions, and other circumstances influencing energy production and consumption, the regional energy operator is the energy provider when the energy generators of the region produce more energy than demanded by the loads in the region. Alternatively, the regional energy operator is the energy consumer when the energy generators of the region produce less energy than demanded by the loads in the region. Different energy operators are interconnected with a primary power grid 205 (shown in dashed lines).

In some implementations, power producing entity 210, such as the power generation plants 110 and the renewable or alternative energy sources 220, interfaces with the regional grid via a local control module 215. The local control module 215 can standardize control command responses with each of the plurality of power providers. By offering to the regional control module 225 a standardized response from each of the plurality of power producing entities, the regional control module can actively manage the power grid in a scalable manner. The regional control module 225 is further aware of the electricity producing capacity within the region and the limitations to the distribution grid. The regional control module 225 understands topology with respect to the power providers and power consumers and its own ability to distribute the power.

Each regional control module 225 is communicatively coupled to a control system 275 via, e.g., a wide area network 230. The wide area network can be the Internet or other means to communicate data among remote locations. Additionally or alternatively, the data can be exchanged between the control system 275 and the regional control modules 225 via a local area network or Intranet. To that end, the control system 275 includes a transceiver 280 for exchanging data between the control system and regional control modules 225 via the network 230. Also, control system 275 includes one or several processors 285 and 290 to balance amounts of electricity passing through an electrical grid.

The control system 275 is operable to manage the interaction of several regional control modules 225 and the power providers under their control. As previously described, each regional control module 225 using applicable applications can dynamically manage the power consumers and power providers within its control. As demand (active power or reactive power) within a certain region managed by a regional control module 225 increases or decreases, the regional control module 225 needs to act to compensate for power production within a particular region. To that end, the regional control module 225 makes a decision about supplying or requesting the electricity from the grid. The control system 275 receives, transmits or retransmits such request to balance amount of electricity going in or off the grid.

Some embodiments of the invention are based on recognition that different energy operators that can supply to electricity to an electrical grid or consume the electricity from the electrical grid need to determine their corresponding needs for the amounts of electricity on their own. In such a manner, each energy operator can use its own data and optimization procedure, which decentralize the optimization of the electricity production or consumption and preserve the privacy of individual energy operator.

Figure 1B:
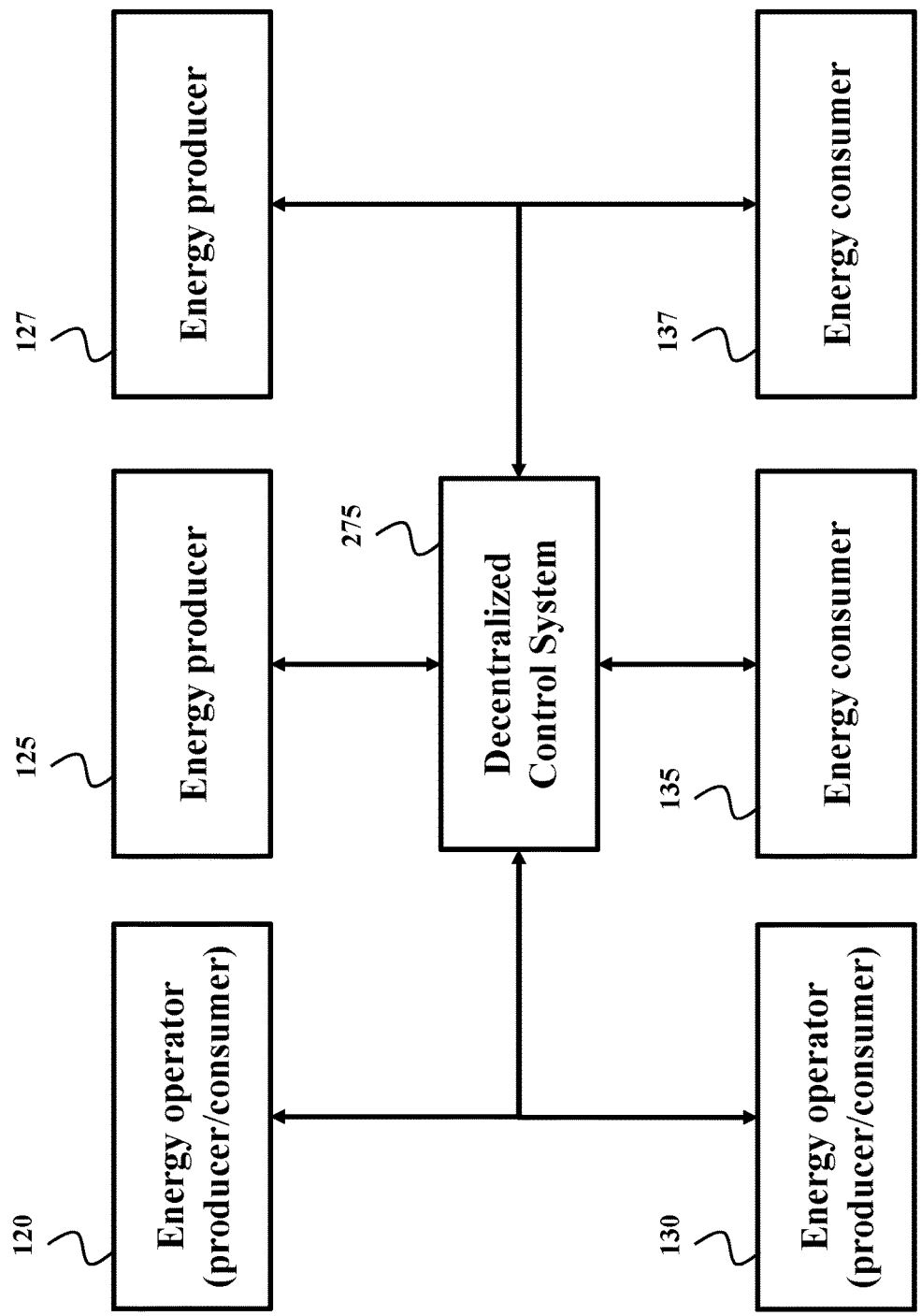
FIG. 1B is a schematic of interactions between control system and each energy operator while preserving privacy constraints of each energy operator according to some embodiments of the invention.

FIG. 1B shows a schematic of interactions between control system 275 and each energy operator while preserving privacy constraints of each energy operator according to some embodiments of the invention. Some embodiments of the invention treat different regional control module 225 as energy providers or energy consumers regardless of the internal structure of the power flow in that region. In such a manner, internal optimizations of power generation or consumption are decoupled among different regions, while allowing exchanging the electricity between the regions. Each regional control module 225 is treated as energy provider 125 and 127 or energy consumer 135 and 137. In some situations, the regional control module 225 can be both energy provider and energy consumer 120 and 130 depending on time of the day, weather conditions, and other circumstances influencing energy production and consumption.

For example, the control system 275 transmits to energy providers and energy consumers requests for the electricity. The request can be submitted over different kinds of the communication channels, such as wired or wireless channels, e.g., the Internet. Notably, the request can differ for different energy providers and energy consumers. For example, the requests can include requests for providing the electricity having parameters varying for at least two energy providers. Similarly, the requests can include requests for consuming the electricity having parameters varying for at least two energy consumers. In such a manner, the control system 275 can accommodate for different needs of different energy operator and/or to make a preference for different types of energy supplied and consumed from the electric grid. For example, the control system 275 can give a preference to renewable source of energy or to local energy consumers.

In response to transmitting the request, the control system 275 receives information about amounts of electricity the energy providers agree to supply or the energy consumers agree to demand to satisfy the requests. Those amounts are determined by each individual energy operator are internal to each operator and the privacy of those methods is preserved.

Based on the received information, the control system 275 determines a balanced amount of electricity for each energy provider and each energy consumer. As used herein, the balanced amount of electricity for each energy provider and each energy consumer is such an amount of electricity that balance the supply and the demand of the electricity in the electrical grid. To that end, the control system 275 balance the electricity in the grid without knowing all internal data and/or optimization methods used by each individual energy operator. Therefore, the control system 275 is referred herein as a decentralized control system.

For example, some embodiments of the invention provide methods for optimizing power flows in electric power networks that maintains balance between demand and supply using a decomposition and coordination procedure. The decomposition procedure distributes the optimization problem into a set of smaller disjoint parameterized optimization problems that are independent of each other. The coordination procedure modifies the parameter associated with the individual problems to ensure that a solution of the entire problem is attained.

Some embodiments of the invention are based on recognition that balancing of the independently determined amounts of electricity under privacy constraints results in optimization of a non-differentiable objective function, which can be solved by a subgradient method. However, the subgradient methods are slower than Newton's method when applied to differentiable convex functions. However, Newton's method fails to converge on problems that have non-differentiable kinks.

Some embodiments of the invention are based on realization that in addition to the amounts for producing and consuming the electricity, the energy operators can share their sensitivities to the variations of the requests for energy. Sharing such a sensitivity does not violate current privacy constraints, but allows improve the search for a balanced amount of electricity for each energy provider and each energy consumer.

There a number of different methods the energy operators can use to determine their sensitivities. For example, if the energy operator uses an optimization function for determining the amount of electricity the energy operator agrees to provide and demand, a value of the partial derivative over a parameter of request corresponding to the value of the parameter is the sensitivity of the objective function to the variation of the value of the parameter.

For example, if the parameter of the request is the price for the electricity, the energy operator can take a partial derivative of its objective function over the price, and the value of the partial derivative corresponding to the value of the price is the sensitivity of the energy provider to the variations of the value of the price. In some embodiments, the amounts of electricity and the sensitivity information do not need to be provided as closed form expressions. It is sufficient that the energy operators submit the numerical value of their sensitivity given the value of the price.

If the requests include different parameters, to determine the sensitivity, the energy operator can take a partial derivative over each of the parameters. Additionally or alternatively, the energy provider can only provide power quantity and no sensitivity. In such cases, the control system can compute an approximate sensitivity by finite differencing.

In different embodiments, different energy operators use different objective function for determining optimal amounts of electricity they need to supply or demand. Examples of such objective functions include a linear combination of the objective function and a squared deviation from a parameter value representing the electricity that is produced or consumed.

Figure 2:
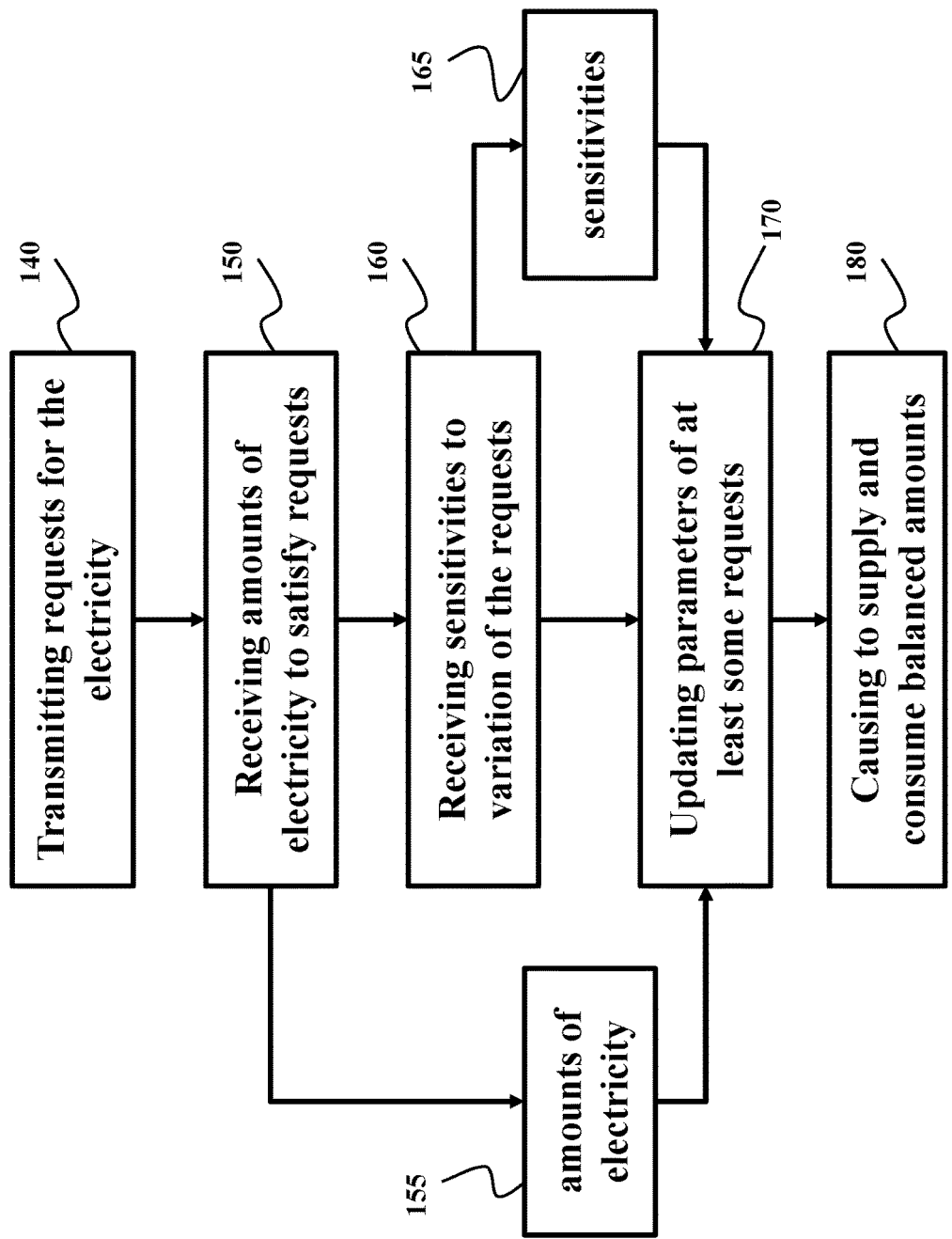
FIG. 2 is a block diagram for a method for controlling an amount of electricity passing through an electrical grid according to one embodiment of the invention.

FIG. 2 shows a block diagram for a method for controlling an amount of electricity passing through an electrical grid according to one embodiment of the invention. The method can be implemented using a transceiver and a processor of the control system 275, such as the transceiver 280 and the processor 285.

The method transmits 140 to energy providers and energy consumers requests for the electricity. The parameters of the requests can differ between different providers and consumers. For example, the requests can include requests for providing the electricity having parameters varying for at least two energy providers. Similarly, the requests can include requests for consuming the electricity having parameters varying for at least two energy consumers. In response to the transmitting 140, the method receives 150, from each energy provider and each energy consumer, an amount of electricity 155 the energy provider agrees to supply or the energy consumer agrees to demand to satisfy the requests.

The request can include one or several parameters for assisting the energy providers and consumers in optimizing their decisions. For example, in one embodiment, the parameter includes a physical quantity of the electricity, such as an amount or an approximation of the amount of electricity. This embodiment is advantageous, because the method submits the parameter that has to be ultimately balanced. In another embodiment, the parameter includes derivative of the physical quantity, such as prices for the electricity. This embodiment is advantageous because the price can directly affect the amount of electricity energy operators agree to supply or consume. In yet another embodiment, the parameter includes artificial optimization parameters, such as a Lagrange multiplier for the power balance at the bus connected to the generator or producer. For example, the parameter of the request is a Lagrange multiplier for a difference between a balance of the request for the electricity and a balance of the amounts of electricity the energy provider agrees to supply or the energy consumer agrees to demand.

In some embodiments, in addition to the amounts of the electricity, the method receives 160, from each energy provider and each energy consumer, a sensitivity 165 of the amount of electricity to a variation of a value of at least one parameter of a corresponding request. For example, if the parameter of the request includes price for the electricity, the sensitivity 165 received from each energy operator is the sensitivity of the amount of electricity to a variation of the corresponding price.

The method updates 170 parameters of at least some requests in directions governed by the corresponding sensitivities to produce a balanced amount of electricity for each energy provider and each energy consumer. In some embodiments, the update 170 is performed iteratively using the sensitivities to increase the convergence of the update. After the method determines balanced amount of electricity for each energy provider and each energy consumer, the method causes 180 the energy providers to supply into the electrical grid their corresponding balanced amounts of electricity and causes 180 the energy consumers to consume from the electrical grid their corresponding balanced amounts of electricity.

Figure 3A:
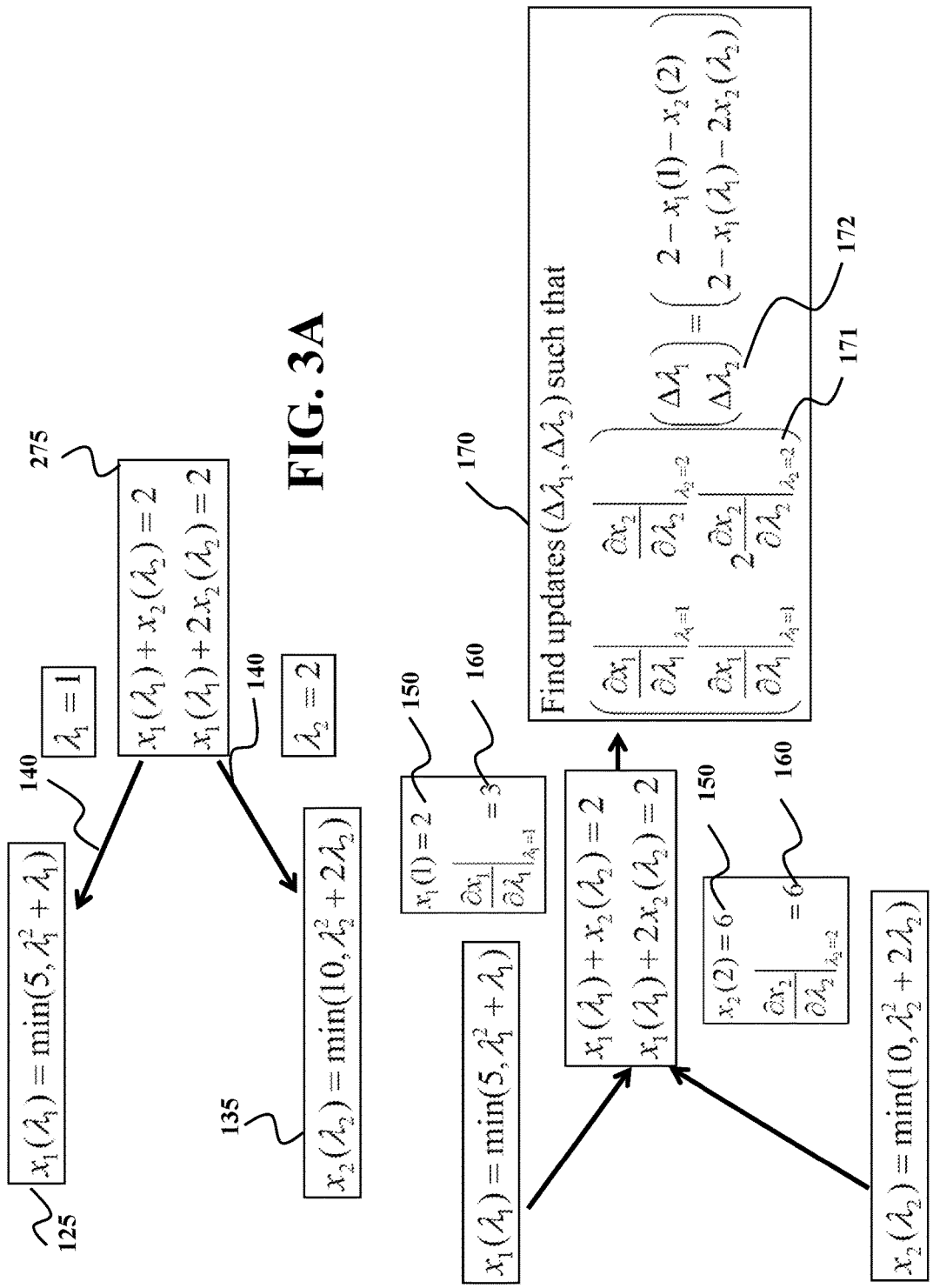
FIG. 3A is a schematic of updating parameters of at least some requests in directions governed by the corresponding sensitivities according to some embodiments of the invention.

FIG. 3A shows a schematic of updating parameters of at least some requests in directions governed by the corresponding sensitivities according to some embodiments of the invention. The decentralized control system 275 transmits parameter 140 and requests electricity quantity, sensitivity to parameters 140 from electricity producer 125 and electricity consumer 135. The electricity quantity 150 and sensitivity 160 is transmitted to decentralized control system. The decentralized control system determines the updates for the parameters 170 using Newton's method.

For example, some embodiments use the sensitivities to formulate the non-smooth, i.e., non-differentiable, equations as semismooth equations, which in turn allows using Newton-based method for the solution. Newton-based method has faster rates of convergence than the subgradient one. Also, the Newton-based method converges at superlinear rate around the solution. To that end, some embodiments solve a semismooth equation of a balance of the supply and the demand of the amounts of electricity to update the parameters of the requests. The solution can be performed iteratively. For example, the method can repeat iteratively the transmitting, the receiving and the updating until a termination condition is met. An example of the termination condition is a number of iterations.

Figure 3B:
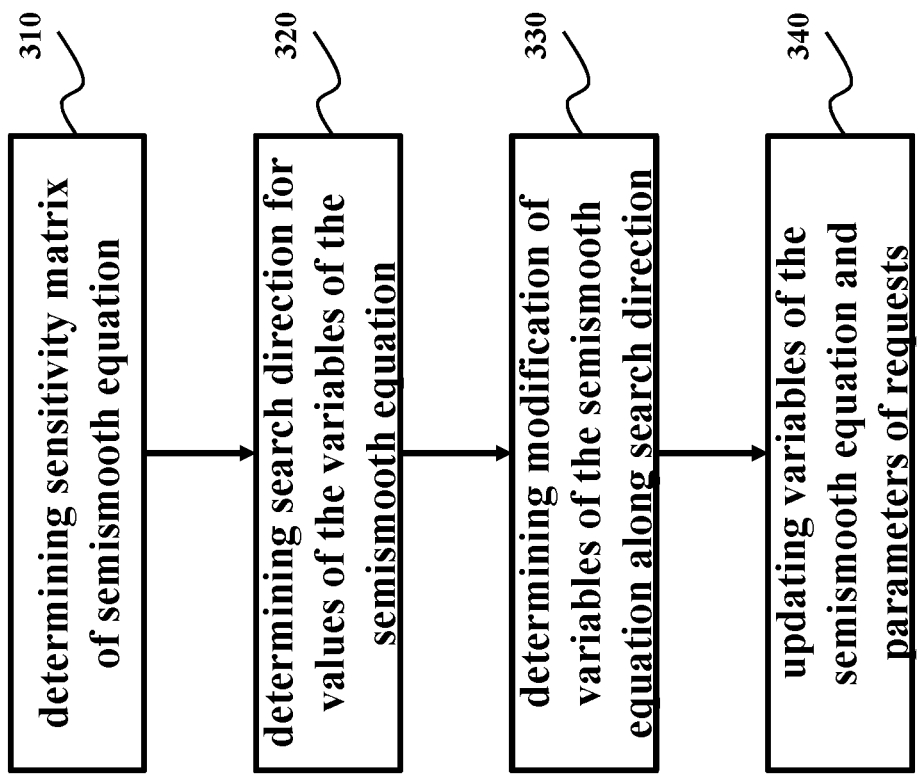
FIG. 3B is a block diagram of a method for solving a semismooth equation of a balance of the supply and the demand of the amounts of electricity according to some embodiments of the invention.

FIG. 3B shows a block diagram of a method for solving a semismooth equation of a balance of the supply and the demand of the amounts of electricity according to some embodiments of the invention. For example, the method determines 310 a sensitivity matrix 171 in FIG. 3A of the semismooth equation with respect to variables of the semismooth equation using the amounts of electricity and the corresponding sensitivities received from each energy provider and energy consumer.

The method determines 320 a search direction for values of the variables of the semismooth equation by solving a linear system formed by the sensitivity matrix 170 in FIG. 3A. The method determine 330 a modification of each variable 172 in FIG. 3A of the semismooth equation along the search direction improving a solution of the semismooth equation. Next, the method updates 340 each variable of the semismooth equation with the modification taken along the corresponding search direction and updating the parameter of the request using the updated variable of the semismooth equation 170 in FIG. 3A.

Exemplar Embodiment

One embodiment of the invention controls an amount of electricity passing through an electrical grid using the sensitivity of energy operator to variation of the price for the electricity. The embodiment decomposes the requests for energy providers and energy consumers into sets of smaller decoupled optimization problems. This embodiment uses the theory of semi-smooth equations balance the supply and demand of the electricity. The semi-smooth equation theory ensures that superlinear convergence is guaranteed in a neighborhood of the solution. Further, the theory allows for using a merit function to ensure global convergence to a solution using initial parameters that are not near the solution.

Input to the method of optimization according to this embodiment includes the following:
1) A graph G(N, E) with a set of N nodes connected by a set of E edges (i,j).
2) A subset of nodes $N^G$ that are connected to electricity producers (GenCos).
3) A subset of nodes $N^D$ that are connected to electricity consumers (DSOs).
4) Constraints $P_l^{max} \forall l=(i,j) \in E$ on apparent and active power transferred on the lines.
5) Matrix of size $|E| \times |N|$ representing the Power Injection Distribution factors for the transmission network.

The embodiment defines the supply and demand optimization problem as $$\min \sum_{i \in N} (\lambda_i^P P_i + \lambda_i^Q Q_i) \quad (1)$$

$$\text{s.t.} \quad -P_l^{max} \leq \sum_{i \in N} A_{li} P_i \leq P_l^{max} \forall l = (i, j) \in E$$

$$\sum_{i \in N} P_i(\lambda_i^P, \lambda_i^Q) = 0$$

$$\sum_{i \in N} Q_i(\lambda_i^P, \lambda_i^Q) = 0$$

where, $\lambda_i^P, \lambda_i^Q \forall i \in N$ are the parameters that are communicated by the decentralized control system to the electricity producer or consumer that is connected to the grid at node i, $P_i, Q_i \forall i \in N$ are the real and reactive power injections at the nodes of the transmission network that is produced or consumed by the electricity producer or consumer that is connected at that node. The term $$\sum_{i \in N} A_{li} P_i$$

in the constraint represents the amount of power that flows on a edge $l=(i,j) \in E$ as a result of the power injections $P_i, Q_i \forall i \in N$. Thus, the constraint imposes limits on the amount of power that can be transferred on a line. The bounds on angle differences between the buses can also be represented by same manner by redefining $P_l^{max}$.

The constraints in Eq (1) are referred to as the DC power flow equations. The constraint summing the real and reactive power injections to zero are the power balance constraints that need to be enforced by the decentralized control system. The first order optimality conditions of the optimization problem in Eq (1) can be written as, $$\begin{pmatrix} \xi^l \\ \xi^u \end{pmatrix} \geq 0 \perp \begin{pmatrix} AP + P^{max} \\ -AP + P^{max} \end{pmatrix} \geq 0 \quad (2)$$

-continued $$\begin{pmatrix} \varsigma^l \\ \varsigma^u \end{pmatrix} \geq 0 \perp \begin{pmatrix} \sum_{i \in N} P_i \\ -\sum_{i \in N} P_i \end{pmatrix} \geq 0$$

$$\begin{pmatrix} \mu^l \\ \mu^u \end{pmatrix} \geq 0 \perp \begin{pmatrix} \sum_{i \in N} Q_i \\ -\sum_{i \in N} Q_i \end{pmatrix} \geq 0$$

$$\lambda^P = A^T(\xi^l - \xi^u) + (\varsigma^l - \varsigma^u),$$
$$\lambda^Q = \mu^l - \mu^u$$

where $\xi^l, \xi^u$ are the Lagrange multipliers for lower and upper line limit constraints in Eq (1), $\varsigma^l, \varsigma^u$ are the Lagrange multipliers for the real power balance constraint that is now posed 2 inequalities, and $\mu^l, \mu^u$ are the Lagrange multipliers for the reactive power balance constraint that is now posed 2 inequalities. The vectors P, Q in (2) represents the vector of all the real and reactive power injections in the network. The constraint a≥0⊥b≥0 between two vectors a,b is a concise representation of the following constraints, $a_i, b_i \geq 0$, $a_i b_i = 0$.

In order for the decentralized problem to be consistent with the response of the electricity producers and consumers, the power quantities in Eq (2) should correspond to the optimal response of the producers and consumers that is denoted as $P_i^*(\lambda_i^P, \lambda_i^Q), Q_i^*(\lambda_i^P, \lambda_i^Q) \forall i \in N$. Substituting this into Eq (2), the optimality conditions can be succinctly represented as, $$v \geq 0, F(v) \geq 0, v_i F_i(v) = 0, \quad (3)$$

where the variables v are the multipliers for the constraints in Eq (1) and the function F(v) are the vector of constraints in Eq (1) are defined as:

$$v = \begin{pmatrix} \xi^l \\ \xi^u \\ \varsigma^l \\ \varsigma^u \\ \mu^l \\ \mu^u \end{pmatrix}, F(v) = \begin{pmatrix} AP^* + P^{max} \\ -AP^* + P^{max} \\ \sum_{i \in N} P_i^* \\ -\sum_{i \in N} Q_i^* \\ \sum_{i \in N} Q_i^* \\ -\sum_{i \in N} Q_i^* \end{pmatrix}. \quad (4)$$

For clarity the dependence of $P_i^*, Q_i^* \forall i \in N$ on $(\lambda_i^P, \lambda_i^Q)$ $\forall i \in N$ has been suppressed in Eq (4). In Eq (4), P*, Q* are the vector of all the power production and consumption quantities from the electricity producers and consumers.

For ease of exposition, consider the following introduction of the Fischer function, $$\phi(v_i) = -v_i - F_i(v) + \sqrt{v_i^2 + F_i(v)^2}. \quad (5)$$

The Fischer function in Eq. (7) has the property that $$\phi_i(v) = 0 \forall i \in N \Leftrightarrow v \geq 0, F(v) \geq 0, v_i F_i(v) = 0$$

Thus, the problem finding a solution to the decentralized control problem can be cast as, $$\Phi(v) = \begin{pmatrix} \phi_1(v) \\ \cdots \\ \phi_{|N|}(v) \end{pmatrix} \quad (6)$$

$$= 0.$$

Eq. (6) is called a non-smooth equation since it is not differentiable. However, it possesses desirable differentiability properties that allow the use of semismooth equations for the solution of Eq. (6). In particular, Newton-based algorithms can be developed for finding a zero of Eq. (6). Newton-based algorithms have faster rates of convergence as compared to subgradient algorithms. Further, once close to the solution they convergence at superlinear rate.

Figure 4:
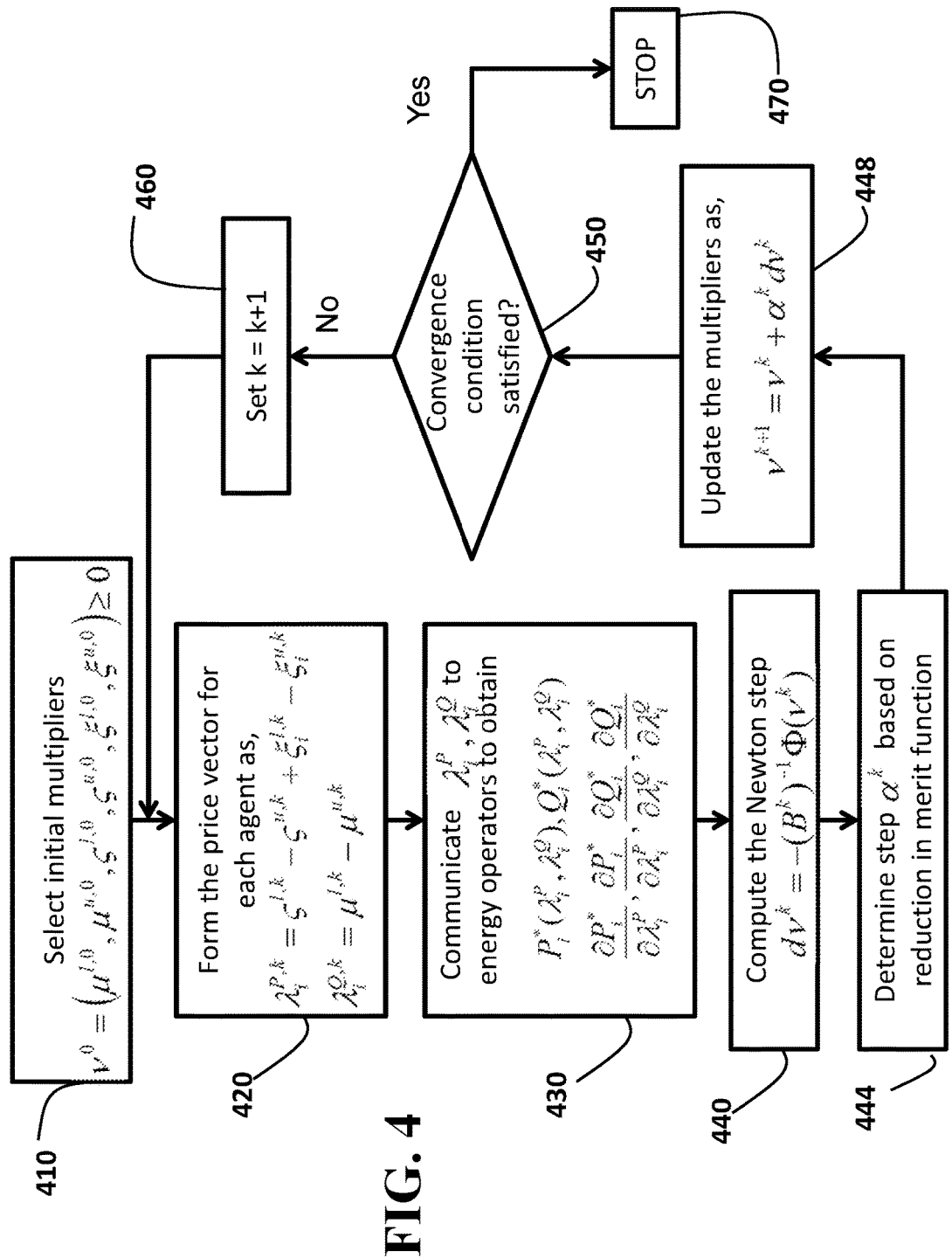
FIG. 4 is a block diagram of a method for balancing the supply and demand of the electricity according to one embodiment of the invention.

FIG. 4 shows a block diagram of a method for balancing the supply and demand of the electricity according to one embodiment of the invention. The method selects 410 an initial non-negative value for the multipliers v of the constraints in Eq (4). Using the selected multipliers, the method determines 420 the prices for each energy provider and energy consumer. For example, the method can determine a price vector for the electricity procurement at each energy operator. The prices $\lambda_i^{P,k}, \lambda_i^{Q,k}$ are communicated 430 to the energy providers and energy consumers in order to receive 430 the optimal amounts of electricity $P_i^*(\lambda_i^{P,k}, \lambda_i^{Q,k}), Q_i^*(\lambda_i^{P,k}, \lambda_i^{Q,k})$ and the sensitivity of the optimal amounts of electricity to the changes in the prices from the energy providers and energy consumers.

The method determines 440 the residual $F(v^k)$ using the optimal amounts of electricity and the corresponding sensitivities. For example, the method determines an element of the subdifferential $B^k \in \partial F(v^k)$ at the given point to determine the Newton step d $v^k$. The Newton step is determined as, $$dv^k = -(B^k)^{-1} \Phi(v^k). \quad (7)$$

The subdifferential matrix $B^k$ is determined as, $$B^k = D_v^k + D_F^k H^k \begin{bmatrix} [A^T & -A^T & 1_{|N|} & -1_{|N|}] & 0 \\ 0 & [1_{|N|} & -1_{|N|}] \end{bmatrix} \quad (8)$$

$$H^k = \begin{bmatrix} \text{diag}\left(\frac{\partial P_1^*}{\partial \lambda_1^P}, \dots, \frac{\partial P_{|N|}^*}{\partial \lambda_{|N|}^P}\right) & \text{diag}\left(\frac{\partial Q_1^*}{\partial \lambda_1^P}, \dots, \frac{\partial Q_{|N|}^*}{\partial \lambda_{|N|}^P}\right) \\ \text{diag}\left(\frac{\partial P_1^*}{\partial \lambda_1^Q}, \dots, \frac{\partial P_{|N|}^*}{\partial \lambda_{|N|}^Q}\right) & \text{diag}\left(\frac{\partial Q_1^*}{\partial \lambda_1^Q}, \dots, \frac{\partial Q_{|N|}^*}{\partial \lambda_{|N|}^Q}\right) \end{bmatrix}$$

$$D_{v,jj}^k = \begin{cases} \frac{v_j^k}{\|(v_j^k, F_j(v^k))\|} - 1 & \forall j \notin \beta^k \\ \frac{z_j}{\|(z_j, z^T \nabla F_j^k)\|} - 1 & \forall j \in \beta^k \end{cases},$$

$$D_{F,jj}^k = \begin{cases} \frac{F_j^k}{\|(v_j^k, F_j(v^k))\|} - 1 & \forall j \notin \beta^k \\ \frac{z^T \nabla F_j^k}{\|(z_j, z^T \nabla F_j^k)\|} - 1 & \forall j \in \beta^k \end{cases}$$

where $1_{|N|}$ is a vector of all ones of length $|N|$, $\beta^k = \{j | v_j^k = 0 = F_j(v^k)\}$ and diag( ) is the diagonalization operator.

Next, the method determines 444 $\alpha^k$, the steplength to move along the computed step, using the sufficient reduction condition. For example, the method determines the largest $\alpha^k \in (0,1]$ such that $$\|\Phi(v^k + \alpha^k dv^k)\|^2 \leq (1 - 2\alpha^k \eta) \|\Phi(v^k)\|^2,$$

where $\eta \in (0,1)$ is a small constant, e.g., $10^{-4}$. The above condition ensures that method makes progress towards solving Eq. (6). The multipliers are updated in 448. The satisfaction of convergence condition 450 is checked. For example, the convergence or termination condition is, $$\|\Phi(v^k)\| \le \varepsilon$$

If the convergence condition holds then the method terminates 470. If not, the method continues with the updated multipliers 460.

Computing Sensitivity of Power Producer/Consumer to Parameter of Request for Electricity Consider the following optimization problem representing the electricity producer or consumer at a bus $i \in N$, $$\min \quad c_i^P(P_i) + c_i^Q(Q_i) - (\lambda_i^P P_i + \lambda_i^Q Q_i) \qquad (9)$$
$$\text{s.t.} \quad A^P P_i + A^Q Q_i \le r$$

where, $c_i^P, c_i^Q$ are cost functions for the electricity producer/consumer and the inequality in Eq (9) represents limits that the electricity producer/consumer has to adhere to. These inequalities can be simple lower and upper bounds on the production or consumption levels. The inequalities can also represent an electrical network as in the case of an electricity consumer representing a distribution system.

Suppose at the optimal solution $P_i^*(\lambda_i^P, \lambda_i^Q), Q_i^*(\lambda_i^P, \lambda_i^Q)$ a subset of the inequality constraints in Eq (9) are satisfied as equalities. Let $\overline{A}^P, \overline{A}^Q, \overline{r}$ represent the rows that correspond to the inequalities that are satisfied as equalities, that is $\overline{A}^P P_i^* + \overline{A}^Q Q_i^* = \overline{r}$. In this case, the sensitivity of the optimal solution to the parameters is computed by solving the linear system, $$\begin{bmatrix} \nabla^2 c_i^P(P_i^*) & 0 & (\overline{A}^P)^T \\ 0 & \nabla^2 c_i^Q(Q_i^*) & (\overline{A}^Q)^T \\ \overline{A}^P & \overline{A}^Q & 0 \end{bmatrix} \begin{bmatrix} \frac{\partial P_i^*}{\partial \lambda_i^P} & \frac{\partial P_i^*}{\partial \lambda_i^Q} \\ \frac{\partial Q_i^*}{\partial \lambda_i^P} & \frac{\partial Q_i^*}{\partial \lambda_i^Q} \\ \frac{\partial \varpi}{\partial \lambda_i^P} & \frac{\partial \varpi}{\partial \lambda_i^Q} \end{bmatrix} = \begin{bmatrix} \lambda_i^P & 0 \\ 0 & \lambda_i^Q \\ 0 & 0 \end{bmatrix} \qquad (10)$$

where $\nabla^2 c_i^P, \nabla^2 c_i^Q$ represent the second derivatives of the cost function in the real and reactive powers with respect to variations respectively in the real and reactive powers evaluated at the optimal solution $P_i^*(\lambda_i^P, \lambda_i^Q), Q_i^*(\lambda_i^P, \lambda_i^Q)$, $$\frac{\partial P_i^*}{\partial \lambda_i^P}, \frac{\partial P_i^*}{\partial \lambda_i^Q}$$

represent the sensitivity of the optimal real power with respect to the parameters, $$\frac{\partial Q_i^*}{\partial \lambda_i^P}, \frac{\partial Q_i^*}{\partial \lambda_i^Q}$$

represent the sensitivity of the optimal reactive power with respect to the parameters, and $$\frac{\partial \varpi}{\partial \lambda_i^P}, \frac{\partial \varpi}{\partial \lambda_i^Q}$$

are the sensitivities of the multipliers for the inequalities in Eq (9) with respect to the parameters.

Exemplar Embodiment

In another embodiment, the electricity producer or consumer does not share the sensitivity with the decentralized control system.

Figure 5:
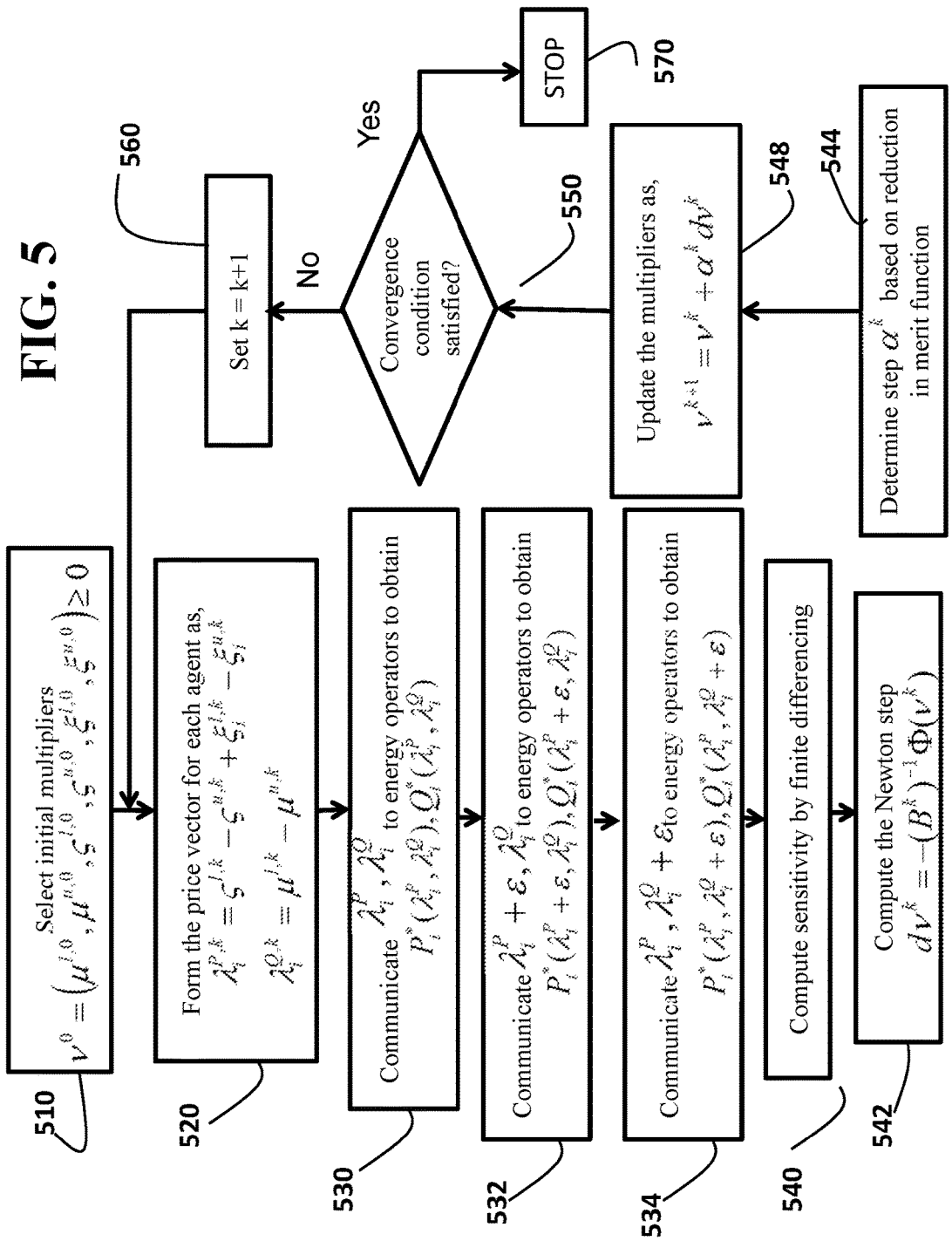
FIG. 5 is a block diagram of a method for balancing the supply and demand of the electricity according to one embodiment of the invention.

FIG. 5 shows a block diagram of a method for balancing the supply and demand of the electricity according to one embodiment of the invention. The method selects 510 an initial non-negative value for the multipliers $v$ of the constraints in Eq (4). Using the selected multipliers, the method determines 520 the prices for each energy provider and energy consumer. For example, the method can determine a price vector for the electricity procurement at each energy operator. The prices $\lambda_i^{P,k}, \lambda_i^{Q,k}$ are communicated 530 to the energy providers and energy consumers in order to receive 530 the optimal amounts of electricity $P_i^*(\lambda_i^{P,k}, \lambda_i^{Q,k}), Q_i^*(\lambda_i^{P,k}, \lambda_i^{Q,k})$. The prices $\lambda_i^{P,k} + \varepsilon, \lambda_i^{Q,k}$ are communicated 532 to the energy providers and energy consumers in order to receive 532 the optimal amounts of electricity $P_i^*(\lambda_i^{P,k} + \varepsilon, \lambda_i^{Q,k}), Q_i^*(\lambda_i^{P,k} + \varepsilon, \lambda_i^{Q,k})$, and the sensitivity of the optimal amounts of electricity to the changes in the prices from the energy providers and energy consumers. The prices $\lambda_i^{P,k}, \lambda_i^{Q,k} + \varepsilon$ are communicated 534 to the energy providers and energy consumers in order to receive 534 the optimal amounts of electricity $$P_i^*(\lambda_i^{P,k}, \lambda_i^{Q,k} + \varepsilon), Q_i^*(\lambda_i^{P,k}, \lambda_i^{Q,k} + \varepsilon).$$

The decentralized control system operator computes the sensitivity as follows, $$\frac{\partial P_i^*}{\partial \lambda_i^P} = \frac{P_i^*(\lambda_i^P + \varepsilon, \lambda_i^Q) - P_i^*(\lambda_i^P, \lambda_i^Q)}{\varepsilon}, \qquad (11)$$

$$\frac{\partial P_i^*}{\partial \lambda_i^Q} = \frac{P_i^*(\lambda_i^P, \lambda_i^Q + \varepsilon) - P_i^*(\lambda_i^P, \lambda_i^Q)}{\varepsilon}$$

$$\frac{\partial Q_i^*}{\partial \lambda_i^P} = \frac{Q_i^*(\lambda_i^P + \varepsilon, \lambda_i^Q) - Q_i^*(\lambda_i^P, \lambda_i^Q)}{\varepsilon},$$

$$\frac{\partial Q_i^*}{\partial \lambda_i^Q} = \frac{Q_i^*(\lambda_i^P, \lambda_i^Q + \varepsilon) - Q_i^*(\lambda_i^P, \lambda_i^Q)}{\varepsilon}$$

The method determines 540 the residual $F(v^k)$ using the optimal amounts of electricity and the corresponding sensitivities. For example, the method determines an element of the subdifferential $B^k \in \partial F(v^k)$ at the given point to determine the Newton step $d v^k$. The Newton step is computed as in Eq (7) and Eq (8).

Next, the method determines 544 $\alpha^k$, the steplength to move along the computed step, using the sufficient reduction condition. For example, the method determines the largest $\alpha^k \in (0,1]$ such that $$\|\Phi(v^k + \alpha^k d v^k)\|^2 \le (1 - 2\alpha^k \eta) \|\Phi(v^k)\|^2$$

where $\eta \in (0,1)$ is typically chosen to be a small constant $10^{-4}$. The above condition ensures that method makes progress towards solving Eq. (6). The multipliers are updated in 548. The satisfaction of convergence condition 550 is checked. For example, the convergence or termination condition is, $$\|\Phi(v^k)\| \leq \varepsilon.$$

If the convergence condition holds then the method terminates 570. If not, the method continues with the updated multipliers 560.

Exemplar Embodiment

In one embodiment, the equations governing the equations in the electrical grid is modeled by the AC power flow equations.

In another embodiment, the balance of the supply and demand is modeled as the optimization problem, $$\min \sum_{i \in N} (\lambda_i^P P_i + \lambda_i^Q Q_i) \quad (12)$$

s.t.

$$h_n(P, Q, V) = 0 \, \forall n = 1, \ldots, Ne$$

$$g_n(P, Q, V) = 0 \, \forall n = 1 \ldots, Ni$$

where $\lambda_i^P, \lambda_i^Q \forall i \in N$ as in Eq (1) are the parameters that are communicated by the grid operator to the energy operators, V are the complex valued voltages at the buses, $h_n(P,Q,V)$ represent the equality constraints in the AC power flow model and $g_n(P,Q,V)$ represent the inequality constraints in the AC power flow model.

In the preferred embodiment, the equality constraints $$h_n(P^G, Q^G, V) = 0 \, \forall n=1, \ldots, Ne$$

are represented as
Power flows on the lines $$\left. \begin{array}{l} S_{jk} = V_j(y_{jk}(V_j - V_k))^* \\ S_{kj} = V_k(y_{jk}(V_k - V_j))^* \end{array} \right\} \forall 1 = (j,k) \in E(i)$$

Power balances at the buses $$\sum_{k \sim j} S_{jk} = S_j^G - S_j^D \, \forall \, j \in N(i),$$

where $S_{jk}=P_{jk}+jQ_{jk}$ denotes the complex valued power transferred from bus j to bus k with $j=\sqrt{-1}$, $S_{kj}=P_{kj}+jQ_{kj}$ denotes the complex valued power transferred from bus k to bus j, $(V_j)^*$ denotes the complex conjugate of the complex valued variable, $S_j^G=P_j^G+jQ_j^G$ denotes the complex valued power produced by the generators and $S_j^D=P_j^D+jQ_j^D$ denotes the complex valued power demands. The variables representing power flow on the lines are used for convenience.

In the preferred embodiment, the inequality constraints $$g_n(P^G, Q^G, V) = 0 \, \forall n=1, \ldots, Ni$$

are represented as
Limit on apparent power transferred on lines $$\left. \begin{array}{l} |S_{jk}| \leq S_{jk}^{max} \\ |S_{kj}| \leq S_{kj}^{max} \end{array} \right\} \forall (j,k) \in E(i)$$

Limit on active power transferred on lines $$\left. \begin{array}{l} \mathrm{Re}(S_{jk}) \leq P_{jk}^{max} \\ \mathrm{Re}(S_{kj}) \leq P_{kj}^{max} \end{array} \right\} \forall (j,k) \in E(i)$$

Limit on thermal loss on lines $$\mathrm{Re}(S_{jk}+S_{kj}) \leq L_{jk}^{max} \forall (j,k) \in E(i)$$

Limit on Voltage Magnitude $$V_j^{min} \leq \sqrt{\mathrm{Re}(V_j)^2 + \mathrm{Im}(V_j)^2} \leq V_j^{max} \forall i \in N(i)$$

where $S_{ij}^{max}, P_{ij}^{max} \forall (i,j) \in E$ are limits on apparent and active power transferred on the lines and $V_i^{min}, V_i^{max} \forall i \in N$ are limits on voltage magnitudes at the buses, and $L_{ij}^{max} \forall (i,j) \in E$ are limits on thermal losses on the lines.

The first-order optimality conditions for the optimization problem in Eq (12) can be written as $$\zeta_n^l \geq 0 \perp h_n(P, Q, V) \geq 0 \quad (13)$$

$$\zeta_n^u \geq 0 \perp -h_n(P, Q, V) \geq 0$$

$$\xi_n \geq 0 \perp -g_n(P, Q, V) \geq 0$$

$$\lambda^P + \sum_{n=1}^{Ne}(-\zeta_n^l + \zeta_n^u)\nabla_P h_n(P, Q, V) - \sum_{n=1}^{Ni} \xi_n \nabla_P g_n(P, Q, V) = 0$$

$$\lambda^Q + \sum_{n=1}^{Ne}(-\zeta_n^l + \zeta_n^u)\nabla_Q h_n(P, Q, V) - \sum_{n=1}^{Ni} \xi_n \nabla_Q g_n(P, Q, V) = 0$$

$$\sum_{n=1}^{Ne}(-\zeta_n^l + \zeta_n^u)\nabla_V h_n(P, Q, V) - \sum_{n=1}^{Ni} \xi_n \nabla_V g_n(P, Q, V) = 0$$

where, $\zeta_n^l, \zeta_n^u$ are lagrange multipliers for the equality constraints $h_n(P,Q,V)=0$ that is now reformulated as two inequalities, $\xi$ are the lagrange multipliers for the inequality constraints $g_n(P,Q,V) \leq 0$, $\nabla_P h_n, \nabla_Q h_n$ represent the gradients of the equality constraints with respect to real and reactive power injections at the buses of the grid, and $\nabla_P g_n, \nabla_Q g_n$ represent the gradients of the inequality constraints with respect to real and reactive power injections at the buses of the grid.

Using Eq (13), the semismooth equations for determining the parameters that match demand and supply can be written as in Eq (3) with $v, F(v)$ are as defined below:

$$v = \begin{pmatrix} \zeta^l \\ \zeta^u \\ \xi \\ \theta^l \\ \theta^u \end{pmatrix}, F(v) = \begin{pmatrix} h(P^*, Q^*, V) \\ -h(P^*, Q^*, V) \\ -g(P^*, Q^*, V) \\ f(P^*, Q^*, V) \\ -f(P^*, Q^*, V) \end{pmatrix}$$

where $$f(P^*, Q^*, V) = \sum_{n=1}^{Ne}(-\zeta_n^l + \zeta_n^u)\nabla_V h_n(P^*, Q^*, V) - \sum_{n=1}^{Ni} \xi_n \nabla_V g_n(P^*, Q^*, V).$$

The vectors $P^*, Q^*$ represent the optimal power quantities computed by the energy operators for the given parameters $\lambda_i^P, \lambda_i^Q$. The parameters $\theta^l, \theta^u$ have been introduced only for the sake of a unified presentation. As is evident they do not affect the computation of $\lambda_i^P, \lambda_i^Q$.

The algorithm described in FIG. 4 can be applied in an identical manner with the definition of the parameters 420 replaced by $$\lambda^P = \sum_{n=1}^{Ne}(\zeta_n^l - \zeta_n^u)\nabla_P h_n(P, Q, V) + \sum_{n=1}^{Ni}\xi_n \nabla_P g_n(P, Q, V) \quad (14)$$

$$\lambda^Q = \sum_{n=1}^{Ne}(\zeta_n^l - \zeta_n^u)\nabla_Q h_n(P, Q, V) + \sum_{n=1}^{Ni}\xi_n \nabla_Q g_n(P, Q, V)$$

In another embodiment, the algorithm in FIG. 5 can be applied where no sensitivity information is obtained from energy operators and the parameter definition is 520 is replaced by Eq (14).

Exemplar Embodiment

In one embodiment, the AC power flow equations for the grid are modeled using a convex formulation such as the semidefinite relaxation. The balance of the supply and demand is modeled as the optimization problem, $$\text{minimize} \quad (15)$$

$$\sum_{i \in N}(\lambda_i^P P_i + \lambda_i^Q Q_i)$$

subject to $H_n(P^G, Q^G, W) = 0 \,\forall\, n = 1, \ldots, Ne$ $G_n(P^G, Q^G, W) \leq 0 \,\forall\, n = 1, \ldots, Ni$ $(V_i^{min})^2 \leq Tr(M_i W) \leq (V_i^{max})^2 \,\forall\, i \in N$ $W \succeq = 0$, $W$ is $2|N| \times 2|N|$ symmetric matrix where $W \succeq = 0$ denotes that matrix $W$ must be positive semidefinite, the matrix operator $Tr(\ )$ is defined as $$Tr(AB) = \sum_{n=1}^{|N|}\sum_{m=1}^{|N|} A_{n,m} B_{m,n}$$

and the matrix $M_i$ is defined as $$M_i = \begin{bmatrix} e_i e_i^T & 0 \\ 0 & e_i e_i^T \end{bmatrix},$$

where $e_i$ denotes a vector of size $|N|$ with a 1 at the i-th component and zeros elsewhere.

The equality constraints in the semidefinite relaxation (Eq. 2) are written as, $$\left.\begin{array}{l}P_{ij} = Tr(Y_{ij}W) \\ Q_{ij} = Tr(\overline{Y}_{ij}W) \\ P_{ji} = Tr(Y_{ji}W) \\ Q_{ji} = Tr(\overline{Y}_{ji}W)\end{array}\right\} \forall\, (i,j) \in E$$

$P_i^G - P_i^D = Tr(Y_i W) \,\forall\, i \in N$ $Q_i^G - Q_i^D = Tr(\overline{Y}_i W) \,\forall\, i \in N$ where, the matrices $Y_{ij}, Y_{ji}, Y_i, \overline{Y}_i$ are defined as shown in FIG. 7.

The first-order optimality conditions for the optimization problem in Eq (15) can be written as $$\zeta_n^l \geq 0 \perp H_n(P, Q, W) \geq 0 \quad (16)$$

$$\zeta_n^u \geq 0 \perp -H_n(P, Q, W) \geq 0$$

$$\xi_n \geq 0 \perp -G_n(P, Q, W) \geq 0$$

$$W \succeq =$$

$$0 \perp \sum_{n=1}^{Ne}(-\zeta_n^l + \zeta_n^u)\nabla_W H_n(P, Q, W) - \sum_{n=1}^{Ni}\xi_n \nabla_V g_n(P, Q, V) \succeq = 0$$

$$\lambda^P + \sum_{n=1}^{Ne}(-\zeta_n^l + \zeta_n^u)\nabla_P H_n(P, Q, W) - \sum_{n=1}^{Ni}\xi_n \nabla_P G_n(P, Q, W) = 0$$

$$\lambda^Q + \sum_{n=1}^{Ne}(-\zeta_n^l + \zeta_n^u)\nabla_Q H_n(P, Q, W) - \sum_{n=1}^{Ni}\xi_n \nabla_Q G_n(P, Q, W) = 0$$

where, $\zeta_n^l, \zeta_n^u$ are lagrange multipliers for the equality constraints $H_n(P,Q,W)=0$ that is now reformulated as two inequalities, $\xi$ are the lagrange multipliers for the inequality constraints $G_n(P,Q,W) \leq 0$, $\nabla_P H_n, \nabla_Q H_n$ represent the gradients of the equality constraints with respect to real and reactive power injections at the buses of the grid, $\nabla_P G_n, \nabla_Q G_n$ represent the gradients of the inequality constraints with respect to real and reactive power injections at the buses of the grid, and $\nabla_W H_n, \nabla_W G_n$ represent the gradients of the equality and inequality constraints with respect to semidefinite matrix $W$.

Using Eq (16), the semismooth equations for determining the parameters that match demand and supply can be written as in Eq (3) with $v, F(v)$ are as defined below:

$$v = \begin{pmatrix} \zeta^l \\ \zeta^u \\ \xi \\ W \end{pmatrix}, F(v) = \begin{pmatrix} H(P^*, Q^*, W) \\ -H(P^*, Q^*, W) \\ -G(P^*, Q^*, W) \\ F(P^*, Q^*, W) \end{pmatrix}$$

where $$F(P^*, Q^*, W) =$$

$$\sum_{n=1}^{Ne}(-\zeta_n^l + \zeta_n^u)\nabla_V H_n(P^*, Q^*, W) - \sum_{n=1}^{Ni}\xi_n \nabla_V G_n(P^*, Q^*, W).$$

The vectors $P^*, Q^*$ represent the optimal power quantities computed by the energy operators for the given parameters $\lambda_i^P, \lambda_i^Q$.

The algorithm described in FIG. 4 can be applied in an identical manner with the definition of the parameters 420 replaced by $$\lambda^P = \sum_{n=1}^{Ne}(\zeta_n^l - \zeta_n^u)\nabla_P H_n(P, Q, V) + \sum_{n=1}^{Ni}\xi_n \nabla_P G_n(P, Q, V) \quad (17)$$

$$\lambda^Q = \sum_{n=1}^{Ne}(\zeta_n^l - \zeta_n^u)\nabla_Q H_n(P, Q, V) + \sum_{n=1}^{Ni}\xi_n \nabla_Q G_n(P, Q, V)$$

In another embodiment, the algorithm in FIG. 5 can be applied where no sensitivity information is obtained from energy operators and the parameter definition is 520 is replaced by Eq (17).

Exemplar Embodiment

In one embodiment, the theory of the alternating method of multipliers is used to decentralize the optimization problem so as to allow privacy preserving of the energy operators. The energy operators minimize a linear combination of the objective function and a squared deviation from a parameter. No sensitivity information from the energy operators is obtained.

The embodiment defines the supply and demand optimization problem as $$\min \sum_{i \in N} (\lambda_i^P P_i + \lambda_i^Q Q_i) + \frac{\rho}{2} \sum_{i \in N} ((P_i - P_i^*)^2 + (Q_i - Q_i^*)^2) \quad (18)$$

$$\text{s.t.}$$

$$-P_l^{max} \leq \sum_{i \in N} A_{li} P_i \leq P_l^{max} \,\forall\, l = (i, j) \in E$$

$$\sum_{i \in N} P_i(\lambda_i^P, \lambda_i^Q) = 0$$

$$\sum_{i \in N} Q_i(\lambda_i^P, \lambda_i^Q) = 0$$

Where $\lambda_i^P, \lambda_i^Q$ are Lagrange multipliers for constraints equating the real and reactive power quantities of the control system and the energy operators, $\rho$ is a penalty parameter and the quantities $P_i^*, Q_i^*$ are optimal solutions obtained from the energy operators. The energy operators solve the optimization problem, $$\min c_i^P(P_i) + c_i^Q(Q_i) + \frac{\rho}{2}\left((P_i - \hat{P}_i)^2 + (Q_i - \hat{Q}_i)^2\right) \quad (19)$$

$$\text{s.t.} \quad A^P P_i + A^Q Q_i \leq r$$

where, $c_i^P, c_i^Q$ are cost functions for the electricity producer/consumer and the inequality in Eq (19) represents limits that the electricity producer/consumer has to adhere to. The parameters $\hat{P}_i, \hat{Q}_i$ are communicated to the energy operators by the decentralized control system operator and is computed as, $$\hat{P}_i = \overline{P}_i - \frac{\lambda_i^P}{\rho}, \hat{Q}_i = \overline{Q}_i - \frac{\lambda_i^Q}{\rho}, \quad (20)$$

where $\overline{P}_i, \overline{Q}_i$ are the optimal solutions of Eq (18). Given that the optimization problems in Eq (18) and Eq (19) involve each other's optimization solutions.

FIG. 6 shows a block diagram of a method for balancing the supply and demand of the electricity according to one embodiment of the invention. The method proceeds sequentially whereby the control system assumes an initial value 610 of $\overline{P}_i, \overline{Q}_i, \lambda_i^P, \lambda_i^Q$ and computes the parameters 620 $\hat{P}$, $\hat{Q}$ as given by Eq (20). The parameters $\hat{P}, \hat{Q}$ are communicated 630 to the energy operators. The solution from the energy operators $P_i^*, Q_i^*$ is obtained 630 from the energy operators by the control system. The control system then solves the optimization problem in Eq (18) 635 to obtain the new values for the $\overline{P}_i, \overline{Q}_i$.

The control system then updates the parameters $\lambda_i^P, \lambda_i^Q$ 640 using $$\lambda_i^P = \lambda_i^P + \rho(\hat{P}_i - P_i^*),$$

$$\lambda_i^Q = \lambda_i^Q + \rho(\hat{Q}_i - Q_i^*) \quad (21)$$

The satisfaction of convergence condition 650 is checked. For example, the convergence or termination condition is, $$\max_{i \in N}\{|P_i^{*,k+1} - \overline{P}_i^{k+1}|, |Q_i^{*,k+1} - \overline{Q}_i^{k+1}|, |\lambda_i^{P,k+1} - \lambda_i^{P,k}|, |\lambda_i^{Q,k+1} - \lambda_i^{Q,k}|\} \leq \varepsilon.$$

If the convergence condition holds then the method terminates 670. If not, the method continues with the updated multipliers 660.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling an amount of electricity passing through an electrical grid, comprising:
transmitting via a transceiver, through a communication channel by an operator of the electric grid, to energy providers and energy consumers connected to the grid requests for the electricity, wherein the operator requests the energy providers for providing an amount of the electricity for the period of time having parameters varying for at least two energy providers, and wherein the operator requests the energy consumers for consuming an amount of the electricity for the same period of time having parameters varying for at least two energy consumers;

receiving via the transceiver, from each energy provider and each energy consumer, the amount of electricity the energy provider agrees to supply based upon the parameters or the energy consumer agrees to demand based upon the parameters to satisfy the requests;

transmitting, to the energy providers and the energy consumers requests for sensitivities, wherein the operator requests the energy providers a sensitivity of the amount of electricity to a variation of at least one parameter of a corresponding request, and wherein the operator requests the energy consumers a sensitivity of the amount of electricity to a variation of at least one parameter of a corresponding request;

receiving, from each energy provider and each energy consumer, the sensitivity of the amount of electricity to the variation of the at least one parameter of the corresponding request;

updating parameters of at least some electricity requests based on the received corresponding sensitivities until a convergence to a solution to produce a balanced amount of electricity for at least one energy provider and at least one energy consumer is met, resulting in actively managing the balancing and supply and demand of the power grid; and initiating the at least one energy provider to supply into the electrical grid their corresponding agreed balanced amounts of electricity and initiating the at least one energy consumer to consume from the electrical grid their corresponding agreed balanced amounts of electricity, wherein steps of the method are performed using a processor, such that the method.

2. The method of claim 1, wherein the updating the parameters comprises:

solving a semismooth equation of a balance of the supply and the demand of the amounts of electricity to update the parameters of the requests; and repeating iteratively the transmitting, the receiving and the updating until a termination condition is met.

3. The method of claim 2, wherein the solving comprises:

determining a sensitivity matrix of the semismooth equation with respect to variables of the semismooth equation using the amounts of electricity and the corresponding sensitivities received from each energy provider and energy consumer;

determining a search direction for values of the variables of the semismooth equation by solving a linear system formed by the sensitivity matrix;

determining a modification of each variable of the semismooth equation along the search direction improving a solution of the semismooth equation; and updating each variable of the semismooth equation with the modification taken along the corresponding search direction and updating the parameter of the request using the updated variable of the semismooth equation.

4. The method of claim 3, wherein the parameter of the request is a Lagrange multiplier for a difference between a balance of the request for the electricity and a balance of the amounts of electricity the energy provider agrees to supply or the energy consumer agrees to demand power quantities determined by the control systems and power quantities determined by the energy operators.

5. The method of claim 1, wherein the parameter of the request is a price for the electricity.

6. The method of claim 1, wherein the parameter of request is an approximation of the amount of electricity.

7. The method of claim 6, further comprising:

receiving, from each energy provider and each energy consumer, the amount of electricity the energy provider agrees to supply or the energy consumer agree to demand, wherein each amount of electricity is determined by an optimization of an objective function penalized for a deviation from the approximation of the amount of electricity; and updating the approximation of the amount of electricity for at least some of the energy providers and energy consumers, such as a combination of the updated approximations of the amount of electricity for all energy providers and energy consumers balances the supply and the demand for the electricity.

8. The method of claim 1, wherein the energy provider or the energy consumer is a regional energy operator distributing energy between energy generators and loads located within a corresponding region, wherein the regional energy operator is the energy provider when the energy generators of the region produce more energy than demanded by the loads in the regions, and wherein the regional energy operator is the energy consumer when the energy generators of the region produce less energy than demanded by the loads in the regions.

9. The method of claim 8, wherein the energy generators of the region include renewable source of the energy.

10. A method for controlling an amount of electricity passing through an electrical grid, comprising:

transmitting by an operator of the electric grid to each energy provider and each energy consumer their corresponding prices for an amount of the electricity for a period of time;

receiving, from each energy provider and each energy consumer, the amount of electricity the energy provider agrees to supply for its corresponding price or the energy consumer demands at its corresponding price;

transmitting to each energy provider and each energy consumer a request for a sensitivities of the amount of electricity to a variation of the corresponding price;

receiving, from each energy provider and each energy consumer, their sensitivity of the amount of electricity to the variation of the corresponding price;

updating the price to solve a semismooth equation of a balance of the supply and the demand of the amounts of electricity using the received corresponding sensitivities;

repeating iteratively the transmitting, the receiving and the updating to some of the energy providers and to some of the energy consumers until a termination condition is met to produce a balanced amount of electricity for at least one energy provider and at least one energy consumer; and initiating the at least one energy provider to supply into the electrical grid their corresponding agreed balanced amounts of electricity and initiating the at least one energy consumer to consume from the electrical grid their corresponding agreed balanced amounts of electricity, wherein steps of the method are performed using a processor.

11. The method of claim 10, wherein the updating comprises:

determining a sensitivity matrix of the semismooth equation with respect to variables of the semismooth equation using the amounts of electricity and the corresponding sensitivities received from each energy provider and energy consumer;

determining a search direction for values of the variables of the semismooth equation by solving a linear system formed by the sensitivity matrix; and determining a modification of each variable of the semismooth equation along the search direction improving a solution of the semismooth equation; and updating each variable of the semismooth equation with the modification taken along the corresponding search direction and updating the price using the updated variable of the semismooth equation.

12. A system for controlling an amount of electricity passing through an electrical grid, comprising:

a transceiver configured to transmit to energy providers and energy consumers requests for the electricity, wherein the requests include for providing an amount of the electricity for the period of time having parameters varying for at least two energy providers, and wherein the requests include for consuming an amount of the electricity for the same period of time having parameters varying for at least two energy consumers;

receive, from each energy provider and each energy consumer, the amount of electricity the energy provider agrees to supply or the energy consumer agrees to demand to satisfy the requests;

transmit, to the energy providers and the energy consumers requests for sensitivities, wherein the request for each energy provider and each energy consumer, is for a sensitivity of the amount of electricity to a variation of at least one parameter of a corresponding request;

receive, from each energy provider and each energy consumer, the sensitivity of the amount of electricity to the variation of the at least one parameter of the corresponding request; and a processor operatively connected to the transceiver, the processor is configured to update parameters of at least some electricity requests based on the received corresponding sensitivities until a convergence to a solution to produce a balanced amount of electricity for each energy provider and each energy consumer is met; and generate a command initiating the energy providers to supply into the electrical grid their corresponding agreed balanced amounts of electricity and initiating the energy consumers to consume from the electrical grid their corresponding agreed balanced amounts of electricity.

13. The system of claim 12, wherein the processor solves a semismooth equation of a balance of the supply and the demand of the amounts of electricity to update the parameters of the requests.

14. The system of claim 13, wherein the processor processes instructions stored in a memory of the system to execute a method for solving semismooth equation, steps of the method comprising:

determining a sensitivity matrix of the semismooth equation with respect to variables of the semismooth equation using the amounts of electricity and the corresponding sensitivities received from each energy provider and energy consumer;

determining a search direction for values of the variables of the semismooth equation by solving a linear system formed by the sensitivity matrix;

determining a modification of each variable of the semismooth equation along the search direction improving a solution of the semismooth equation; and updating each variable of the semismooth equation with the modification taken along the corresponding search direction and updating the parameter of the request using the updated variable of the semismooth equation.

15. The system of claim 12, wherein the parameter of the request is a price for the electricity.

16. The system of claim 12, wherein the parameter of request is an approximation of the amount of electricity.

17. The system of claim 16, wherein the transceiver receives, from each energy provider and each energy consumer, the amount of electricity the energy provider agrees to supply or the energy consumer agree to demand, wherein each amount of electricity is determined by an optimization of an objective function penalized for a deviation from the approximation of the amount of electricity; and the processor updates the approximation of the amount of electricity for at least some of the energy providers and energy consumers, such as a combination of the updated approximations of the amount of electricity for all energy providers and energy consumers balances the supply and the demand for the electricity.

18. The system of claim 12, wherein the energy provider or the energy consumer is a regional energy operator distributing energy between energy generators and loads located within a corresponding region, wherein the regional energy operator is the energy provider when the energy generators of the region produces more energy than demanded by the loads in the regions, and wherein the regional energy operator is the energy consumer when the energy generators of the region produces less energy than demanded by the loads in the regions.

19. The system of claim 18, wherein the energy generators of the region include renewable source of the energy.

20. The system of claim 12, wherein the processor determines parameters of at least some requests using a convex formulation of power flow for the electrical grid modeled using a semidefinite relaxation.

* * * * *